United States Patent Office 3,464,933
Patented Sept. 2, 1969

3,464,933
NOVEL C-N BACKBONE POLYMERS
Alan J. Levy and Morton H. Litt, Morristown, N.J., assignors to Allied Chemical Corporation, New York, N.Y., a corporation of New York
No Drawing. Filed May 12, 1967, Ser. No. 637,923
Int. Cl. C08g *33/06*
U.S. Cl. 260—2                                  7 Claims

ABSTRACT OF THE DISCLOSURE

This invention relates to novel polymers of oxazolines having substituents on the 2-position of the formula

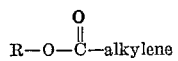

where R is a hydrocarbon radical.

---

The novel oxazolines of the invention have the formula

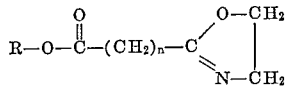

wherein R represents a monovalent hydrocarbon radical and $n$ is an integer from 0 to 15. Preferably R is an alkyl or aralkyl radical of 1 to 12 carbon atoms. Particularly outstanding results are obtained when R is an alkyl group of 1 to 5 carbon atoms and $n$ is an integer of 0 to 8. These oxazolines can be polymerized to form polyethylenimines having recurring units of the formula

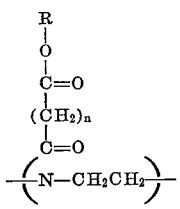

wherein R and $n$ are as defined above. These polymers have a reactive ester group containing side chain on each and every nitrogen atom in the backbone and are water soluble when $n$ is 1 to 3.

The 2-substituted-2-oxazolines of this invention can be prepared by cyclodehydrohalogenation of the corresponding N-(β-haloethyl)amides. These N-(β-haloethyl)amides can be prepared by reacting a dibasic acid or cyclic anhydride thereof where such exists (i.e., succinic and glutaric acids) with an alcohol to form the acid ester, chlorinating the remaining carboxyl group with a chlorination agent such as thionyl chloride and then reacting the acid chloride with ethylenimine to give the desired amides. These reactions are illustrated by the following equations:

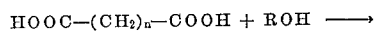
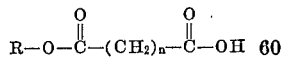
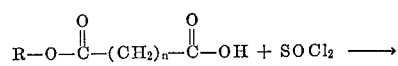
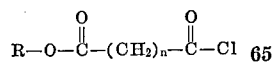
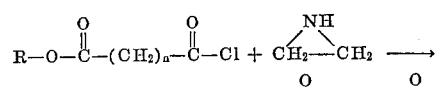

where $n$ and R have the meanings given above. Cyclodehydrohalogenation of the amides can be carried out according to known methods, such as those described by Wiley et al., Chemical Rev., 44, 447–475 (1949), whereby the amide is reacted with sodium hydroxide or potassium hydroxide in aqueous or water-alcohol solutions. Alternatively and preferably, the N-(β-haloethyl)amide is reacted with anhydrous sodium carbonate at a temperature high enough to recover the desired 2-substituted-2-oxazoline by distillation. This method is disclosed in a co-pending patent application, U.S. Ser. No. 450,163, filed Apr. 22, 1965, by T. G. Bassiri, now U.S. Patent No. 3,331,851.

The polymerization of the 2-substituted-2-oxazolines of the invention can be carried out by heating them in an inert atmosphere in the presence of a cationic catalyst such as alkyl halides, boron-fluorine compounds, antimony-fluorine compounds, strong acids, salts of strong acids with an oxazoline or an oxazine, carbonic acid anhydrides, iodine, esters of strong acids, strongly acidic ion exchange resins, acid activated clays, tin halides and aluminum halides. Illustrative of catalysts that can be employed are methyl iodide, 1,4-dibromobutane, boron trifluoride etherate, antimony pentafluoride, p-toluene sulfonic acid, sulfuric acid, nitric acid, perchloric acid, hydrobromic acid, hydroiodic acid, dimethyl sulfate, methyl p-toluene sulfonate, the salt of 2-phenyl-2-oxazine with perchloric acid, aluminum chloride, tin chloride and the perchlorate salt of 2-(p-chlorophenyl)-2-oxazoline. In general, a mol ratio of about 10 to about 10,000 mols of monomer per mol of catalyst will be employed. Increasing the catalyst concentration will tend to lower the molecular weight of the resultant polymer.

The temperature at which the polymerization is carried out may range from about 80° C. to about 250° C. The preferred temperature range is from about 100° C. to about 200° C. The time required to polymerize the monomers of the invention may vary from several minutes to several days depending upon the reactivity of the monomer, the temperature of polymerization, the type of catalyst and its concentration, and the desired molecular weight.

In carrying out the polymerization, a single monomer can be used to produce a homopolymer, or two or more different monomers within the scope of the invention can be used to produce copolymers. Additionally, a modification of the polymers of the invention can be obtained if the monomers described hereinabove are admixed with one or more monomers of the formula

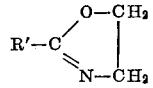

wherein R′ represents a hydrocarbon radical such as alkyl, aryl, aralkyl, alicyclic and alkenyl groups or a halogenated hydrocarbon radical. Preferably R′ is alkyl of 1 to 20 carbon atoms such as methyl, isobutyl, pentyl, heptyl, undecyl and heptadecyl; halogenated alkyl of 1 to 20 carbon atoms such as dichloromethyl, trichloromethyl, pentafluoroethyl and pentadecafluoroheptyl; aryl such as phenyl and naphthyl; halogenated aryl such as p-chlorophenyl; aralkyl such as benzyl; alkylaryl such as tolyl; saturated alicyclic such as cyclohexyl and alkylene such as decenyl.

The polymers of the invention vary in properties from hard solids to flexible materials depending upon the length of the side chain and the molecular weight of the polymer. Those polymers which have a short side chain, e.g., when $n$ is from 1 to 3, are soluble in water and other polar solvents such as alcohols, ethylene glycol, and the like, and form films from solution. These resins can be used in hair sprays. Amorphous polymers insoluble in water can be used as adhesives and can be cross-linked for use as rubbers and for use in paints. High molecular weight, water insoluble crystalline polymers can be used as molding compositions. In addition, the polymers undergo various chemical reactions through the ester group on the polymer side chains including hydrolysis, ammonolysis and cross-linking with conventional cross-linking agents, including diols, polyols, diamines and polyamines.

In particular, the polymers of the invention hydrolyze readily when reacted with an alkali metal hydroxide in solution to form the corresponding metal salt having recurring units of the formula

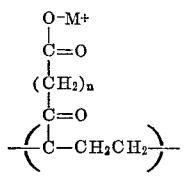

wherein M+ is an alkali metal ion, particularly sodium ion or potassium ion. These polymer salts are water soluble, and they are useful as thickening agents. They form water-insoluble salts with other metallic ions in solution including ferric ion, cobaltous ion, nickel ion, chromium ion, manganese ion, zinc ion, and the like. These insoluble salts are useful in paints and as coatings, especially to inhibit corrosion.

The following examples are given to further illustrate the invention, but it is to be understood that the invention is not to be limited by the details described therein. In the examples all percents are by weight.

EXAMPLE 1

A mixture of 400 grams of succinic anhydride and 194 ml. of anhydrous methanol was refluxed on a steam bath for 1 hour. The excess methanol was removed by fractional distillation under reduced pressure and the residual liquid was cooled and the half-ester, methyl hydrogen succinate, crystallized. A total of 508 grams of this product was recovered by filtration.

A solution of 264 grams of methyl hydrogen succinate and 290 ml. of thionyl chloride was warmed at 35°–40° C. for three hours and kept at room temperature overnight. The dissolved HCl and $SO_2$ and excess thionyl chloride were removed under reduced pressure. 285.1 grams of β-carbomethoxy propionyl chloride, B.P. 78° C./7 mm., were recovered by fractional distillation.

A solution of 207.4 grams of β-carbomethoxy propionyl chloride in 1 liter of ether was added to a flask equipped with a reflux condenser. To this was slowly added a solution of 71.5 ml. of ethylenimine in 450 ml. of ether at such a rate as to maintain reflux. The reaction mixture was cooled and 187.1 grams of N-(β-chloroethyl)-3-carbomethoxy propionamide precipitated and was recovered by filtration. The filtrate was evaporated to 500 ml. and chilled. An additional 55.7 grams of product precipitated and were recovered by filtration.

A mixture of 239 grams of N-(β-chloroethyl)-3-carbomethoxy propionamide and 95.6 grams of anhydrous sodium carbonate was heated at a pressure of 10 mm. At a temperature of about 115° C. a clear, colorless product began to distill. On redistillation there was obtained 167.1 grams of 2 - (β - carbomethoxyethyl) - 2 - oxazoline, B.P. 115° C./10 mm. Elemental analysis was calculated for $C_7H_{11}NO_3$: C, 53.49, H, 7.06, N, 8.91. Found: C, 52.84, H, 7.05, N, 8.94.

EXAMPLE 2

The general procedure of Example 1 is repeated substituting 4.8 mols of other alcohols for the methanol. The alcohols and the products obtained are listed in Table I.

TABLE I

| Starting alcohol | Product |
|---|---|
| Ethyl alcohol | 2-(β-carboethoxyethyl)-2-oxazoline. |
| Amyl alcohol | 2-(β-carbopentoxyethyl)-2-oxazoline. |
| Benzyl alcohol | 2-(β-carbobenzyloxyethyl)-2-oxazoline. |

EXAMPLE 3

The general procedure of Example 1 is repeated substituting 4.0 mols of glutaric anhydride for the succinic anhydride. The product obtained is 2-(γ-carbomethoxypropyl)-2-oxazoline.

EXAMPLE 4

The general procedure of Example 1 is repeated except that the half-ester is produced by substituting 4.0 mols of dibasic acid for the succinic anhydride. The dibasic acids and the products obtained are listed in Table II.

TABLE II

| Dibasic acid | Product |
|---|---|
| Oxalic acid | 2-carbomethoxy-2-oxazoline. |
| Malonic acid | 2-carbomethoxymethyl-2-oxazoline. |
| Pimelic acid | 2-(ω-carbomethoxypentyl)-2-oxazoline. |
| Sebacic acid | 2-(ω-carbomethoxyoctyl)-2-oxazoline. |

EXAMPLE 5

38.36 grams of 2-(β-carbomethoxyethyl)-2-oxazoline were added to a polymerization tube containing 0.54 ml. of p-chlorophenyl oxazolinium perchlorate catalyst (monomer-to-catalyst mol ratio was 6400:1). The tube was degassed, sealed and heated in an oven at 120° C. for 18 hours.

Poly[N - (3 - methoxycarbonylpropionyl)ethylenimine] was obtained as a hard, clear and colorless solid having a reduced viscosity as a 0.5% by weight solution in m-cresol at 25° C. of 2.35. The polymer was soluble in water.

Measured portions of a solution containing 0.0014 mol per milliliter of the polymer in methanol were admixed with a solution containing a one-half equivalent of hexamethylene diamine and another containing a one-half equivalent of hexamethylene diol. Films were drawn from the resultant viscous solutions which were dried in air and heated to 150° C. for one hour. These films were insoluble in water indicating that cross-linked films were obtained.

EXAMPLE 6

9.87 grams of poly[N-(3-methoxycarbonylpropionyl)ethylenimine] were dissolved in 125 ml. of water and 2.51 grams (0.063 mol) of sodium hydroxide added. The solution was stirred at room temperature for 4.5 hours when all of the base was used up. The water was evaporated to give a 100% yield of the sodium salt of poly[N-(3-carboxypropionyl)ethylenimine]. Infrared analysis confirmed the structure.

A 5% by weight solution of the polymer in water had an absolute viscosity of 92 centipoises.

Portions of an aqueous solution of the polymer salt were admixed with aqueous solutions of ferric, cupric, cobalt and zinc salts. Complexes were formed in all cases as evidenced by the formation of an insoluble precipitate having the color characteristic of each metal ion.

EXAMPLE 7

The general procedure of Example 5 is repeated using the 2-substituted-2-oxazolines of Examples 2 and 3. The oxazoline starting materials and the polymer products are listed in Table III.

TABLE III

| Starting oxazoline | Polymer |
|---|---|
| 2-(β-carboethoxyethyl)-2-oxazoline | Poly[N-(3-ethoxycarbonylpropionyl)ethylenimine]. |
| 2-(β-carbopentoxyethyl)-2-oxazoline | Poly[N-(3-pentoxycarbonylpropionyl)ethylenimine]. |
| 2-(β-carbobenzyloxyethyl)-2-oxazoline | Poly[N-(3-benzyloxycarbonylpropionyl)ethylenimine]. |
| 2-carbomethoxy-2-oxazoline | Poly(N-carbomethoxyformyl)-ethylenimine. |
| 2-carbomethoxymethyl-2-oxazoline | Poly[N-(2-methoxycarbonylacetyl) ethylenimine]. |
| 2-(ω-carbomethoxypentyl)-2-oxazoline | Poly[N-(6-methoxycarbonylhexanoyl) ethylenimine]. |
| 2-(ω-carbomethoxyoctyl)-2-oxazoline | Poly[N-(9-methoxycarbonylnonanoyl)ethylenimine]. |

We claim:
1. A polymer consisting essentially of recurring units of the formula

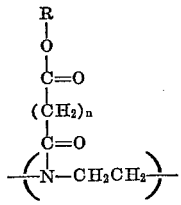

wherein R is a monovalent hydrocarbon radical of up to 12 carbon atoms and n is an integer from 0 to 15.

2. A polymer according to claim 1 wherein R is an alkyl group of 1 to 5 carbon atoms and n is an integer of 0 to 8.

3. A polymer according to claim 1 wherein R is methyl and n is 2.

4. A polymer consisting essentially of recurring units of the formula

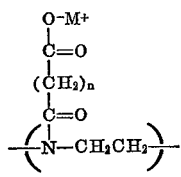

wherein M+ is an alkali metal ion and n is an integer from 0 to 15.

5. A polymer according to claim 4 wherein M+ is a sodium ion.

6. A thermoset product obtained by cross-linking a polymer having recurring units of the formula

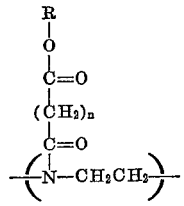

wherein R is a monovalent hydrocarbon radical and n is an integer from 0 to 15, with a cross-linking agent selected from the group consisting of diols, polyols, diamines, and polyamines.

7. A copolymer consisting essentially of recurring units of the formula:

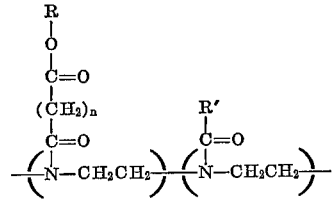

wherein R is as in claim 1 and wherein R' is a hydrocarbon radical or halogenated hydrocarbon radical of up to 20 carbon atoms.

References Cited

UNITED STATES PATENTS 3,373,194    3/1968    Fuhrmann et al. _____ 260—2

FOREIGN PATENTS 666,828    11/1965    Belgium.
581,017     8/1959    Canada.

OTHER REFERENCES

Seeliger et al. I, "Angewandte Chemie, International Ed." vol. 5, October 1966, pp. 875–888, pp. 880–882 only needed.

Seeliger et al. II, "Angewandte Chemie, International Ed." vol. 5, June 1966, p. 612.

SAMUEL H. BLECH, Primary Examiner

U.S. Cl. X.R.

260—29.2, 307, 33.2, 33.4